UNITED STATES PATENT OFFICE 2,374,116

TREATMENT OF WATER CONTAINING CHLORIDES DISSOLVED THEREIN

Howard D. Meincke, Jr., Glencoe, Ill., assignor to Howard D. Meincke, Sr., Glencoe, Ill.

No Drawing. Application March 25, 1944, Serial No. 528,173

11 Claims. (Cl. 210—23)

This invention relates to a process for treating water, containing chlorides dissolved therein, in such manner as to render such water drinkable.

While my invention is capable of more general application, it is particularly useful for those who may have the misfortune to be adrift upon the open sea and with no available supply of fresh water. As is well known to those skilled in the art, sea water contains a combination of many salts in solution, among which are the chlorides of sodium, potassium, calcium and magnesium. Of these salts, the one which is present in the greatest proportion and which renders sea water unsuitable for drinking purposes, is sodium chloride. While it is, therefore, unimportant, from a sanitary standpoint, to remove chlorine from the chlorides other than sodium chloride, my process accomplishes the removal of a sufficient proportion of chlorine from all of the above chlorides to so reduce the remaining proportions of chlorides as to render them harmless.

I am aware that numerous attempts have been made to remove a sufficiently large proportion of sodium chloride from sea water to render the same drinkable, but these attempts have not been commercially or practically successful, owing to the high proportion of sodium chloride in such water. It is due to this high proportion of sodium chloride that it has been impossible to treat the same successfully with zeolites or synthetic resins, such as the amberlites. Attempts have also been made to remove sodium chloride from sea water by chemical reagents capable of forming insoluble chlorides with the chlorine constituent of the sodium chloride, but the resultant sodium compounds which have been formed have been found to be physiologically harmful. This is the case where sea water is treated, for instance, with various silver salts. If silver nitrate or other silver compound is employed for such treatment, the chlorine constituent of the sodium chloride will combine with the silver to produce silver chloride, and the sodium nitrate which is produced is water soluble and is physiologically harmful. Further, where any silver compound is used for the treatment of sea water, silver chloride is produced and, while it is considered to be an insoluble chloride, the fact is that it is soluble to the extent of 1½ milligrams per litre of water, and since the poisoning effect of silver salts is cumulative, silver compounds should, therefore, not be used for the treatment of sea water.

The use of lead and mercurous salts for accomplishing the purpose of my invention is, of course, unthinkable, because the chlorides of both of these elements are definitely poisonous when taken into the human system, even in the form of very dilute solutions.

Within recent years, a group of mercury compounds has been produced, known as the group of phenyl mercury compounds. It has been found that mercury, when utilized to produce any one of such compounds, does not react with chemical reagents in the same manner as the other, and ordinary, compounds of mercury. Furthermore, when properly purified, these phenyl mercury compounds are non-toxic, harmless if taken in reasonable doses, and of very high bactericidal power. Among such compounds are phenyl mercury acetate, phenyl mercury nitrate, phenyl mercury phosphate, phenyl mercury salicylate, phenyl mercury borate, phenyl mercury citrate, etc. Of the various phenyl mercury compounds, I have found the gluconate and the glutamate to be readily soluble in sea water, throughout all ordinary ranges in temperatures of the latter, capable of removing substantially all of the chlorides from such water by simple agitation with the latter, while the resultant compounds (gluconates and gutamates) are physiologically harmless.

In carrying out my process with phenyl mercury gluconate, I mix the same with sea water in approximately the proportions of 135 grams of pure phenyl mercury gluconate to 560 c. c. of water. By agitating this mixture for five minutes or more, I have been able to precipitate from 86% to 92% of the chlorine in the chlorides dissolved in the sea water as insoluble phenyl mercury chloride. This insoluble chloride may be allowed to settle, and the clear liquid containing the harmless by-product (sodium, potassium, calcium and magnesium gluconates), may then be decanted; or the insoluble chloride can be filtered off, the resultant liquid possessing a sufficient degree of purity to render it suitable for drinking purposes, it being noted that the gluconates which remain in solution, are not only physiologically harmless but are excreted from the body. Moreover, since phenyl mercury chloride is soluble only to the extent of 1:30,000 parts by weight of water, the proportion of said chloride in solution is extremely small. However, even in this concentration, it is sufficiently germicidal to render the water sterile. Still further, even if it should be present in a far greater proportion, it would be non-toxic to any human organism. By increasing the proportion of the phenyl mercury gluconate to the sea water, an even higher percentage of chlorine can be removed from the latter.

Except where sea water is very greatly diluted, as where it is taken from a point close to the shore or near the mouth of a river, it would be entirely safe to use phenyl mercury gluconate in the proportions set forth above. Should there be any reason to suspect such dilution, the filtrate should be tested by adding to the same a few drops of the untreated water. In the event that the filtrate remains entirely clear after such addition and retains a saline taste, it is entirely safe to drink the same. Should, however, the filtrate turn cloudy, then it should be thrown away and the water from overside can be drunk without danger.

In carrying out my process with phenyl mercury glutamate, I mix the same with sea water in approximately the proportions of 90 grams of the pure glutamate to 560 c. c. of water. By agitating this mixture for five minutes or more, I am enabled to precipitate as much as 86% to 92% of the chlorine constituents of the chlorides dissolved in sea water as insoluble phenyl mercury chloride. After such precipitation, the resultant liquid and contents thereof may be treated in the same manner as set forth in connection with the use of phenyl mercury gluconate.

Sea or saline water, having been treated in the foregoing manner, is physiologically harmless but possesses a pH of approximately 8.15, which renders it to a certain extent unpalatable. I have found that this comparatively slight objection can be overcome by incorporating an infinitesimal proportion of uric acid into the water to be treated. I accomplish this result preferably by mixing the uric acid with the phenyl mercury gluconate or phenyl mercury glutamate in the proportion of approximately 1 mg. of uric acid to 100 c. c. of the water to be treated. By so doing, I am enabled to reduce the pH of the water to approximately 7.43, which is slightly below the pH of good drinking water.

Having thus described my invention, what I claim is:

1. The process of treating a saline solution for the purpose of removing therefrom chlorides dissolved therein, the said process consisting in adding to such solution a member of the phenyl mercury compound group, consisting of phenyl mercury gluconate and phenyl mercury glutamate, which is readily soluble in the said solution at ordinary ranges of temperature and in a proportion which will precipitate a major portion of the chlorine constituents of the chlorides in said solution as phenyl mercury chloride and to form, with the other constituents of the said chlorides, compounds which are physiologically harmless, and removing phenyl mercury chloride from the solution thus treated.

2. The herein described process of treating a saline solution for the purpose of removing therefrom chlorides dissolved therein, the said process consisting in dissolving a sufficient proportion of phenyl mercury gluconate in said solution to precipitate the major portion of the chlorine constituents of the chlorides in said solution as phenyl mercury chloride and to form gluconates with the other constituents of the chlorides in said solution, and removing phenyl mercury chloride from the solution thus treated.

3. The herein described process of treating a saline solution for the purpose of removing therefrom chlorides dissolved therein, the said process consisting in dissolving phenyl mercury gluconate in such solution in approximately the proportion of 135 grams of pure phenyl mercury gluconate to 560 c. c. of said solution, thereby to precipitate a major portion of the chlorine constituents of the chlorides in said solution as phenyl mercury chloride, and removing the precipitated chloride from the solution thus treated.

4. The herein described process of treating a saline solution for the purpose of removing therefrom chlorides dissolved therein, the said process consisting in dissolving a sufficient proportion of phenyl mercury glutamate in said solution to precipitate the major portion of the chlorine constituents of the chlorides in said solution as phenyl mercury chloride and to form glutamates with the other constituents of the chlorides in said solution, and removing phenyl mercury chloride from the solution thus treated.

5. The herein described process of treating a saline solution for the purpose of removing therefrom chlorides dissolved therein, the said process consisting in dissolving phenyl mercury glutamate in such solution in approximately the proportion of 90 grams of pure phenyl mercury glutamate to 560 c. c. of said solution, thereby to precipitate a major portion of the chlorine constituents of the chloride in said solution as phenyl mercury chloride, and removing the precipitated chloride from the solution thus treated.

6. In the process set forth in claim 1, incorporating uric acid in the water to be treated in a proportion sufficient to reduce the pH thereof to approximately the pH of good drinking water.

7. In the process set forth in claim 1, incorporating uric acid in the water to be treated in the approximate proportion of 1 mg. to 100 c. c. of water.

8. In the process set forth in claim 2, incorporating uric acid in the water to be treated in a proportion sufficient to reduce the pH thereof to approximately the pH of good drinking water.

9. In the process set forth in claim 3, incorporating uric acid in the water to be treated in the approximate proportion of 1 mg. to 100 c. c. of water.

10. In the process set forth in claim 4, incorporating in the water to be treated a proportion of uric acid sufficient to reduce the pH to approximately that of good drinking water.

11. In the process set forth in claim 5, incorporating uric acid with the water to be treated in the approximate proportion of 1 mg. of uric acid to 100 c. c. of water.

HOWARD D. MEINCKE, Jr.